Aug. 17, 1965   W. E. MORRISSEY   3,201,017
FISHING TACKLE BOX
Filed Jan. 2, 1963   4 Sheets-Sheet 1
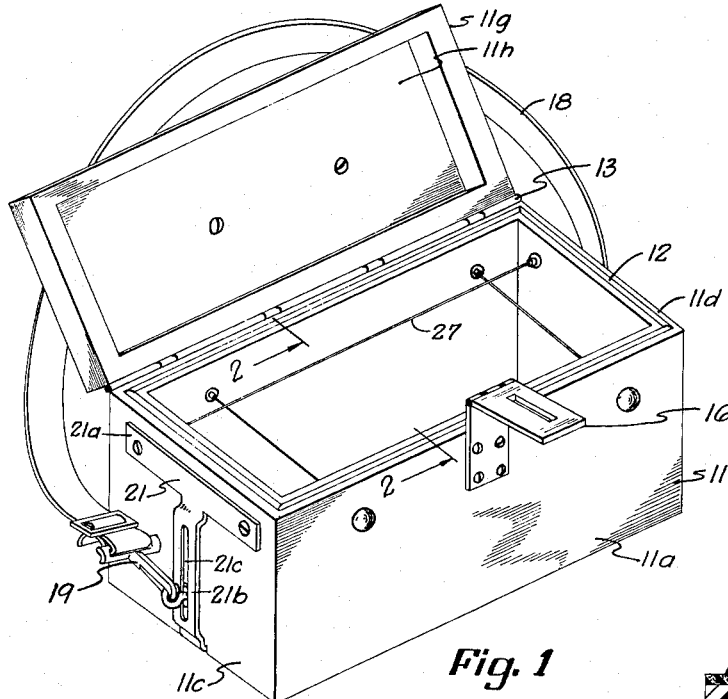
Fig. 1
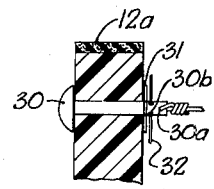
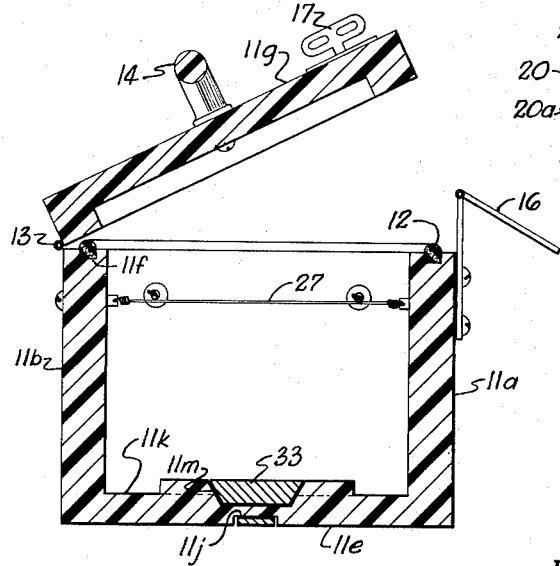
William Ernest Morrissey
INVENTOR
BY John C. Stahl
ATTORNEY

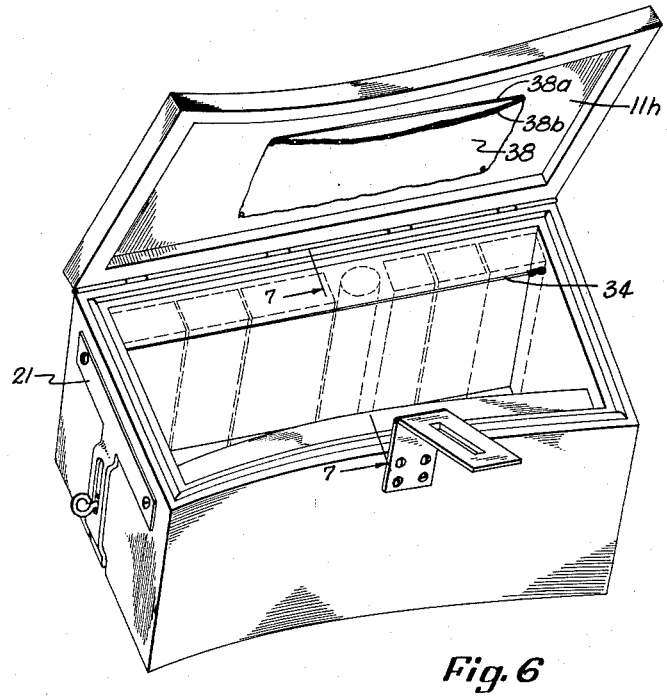
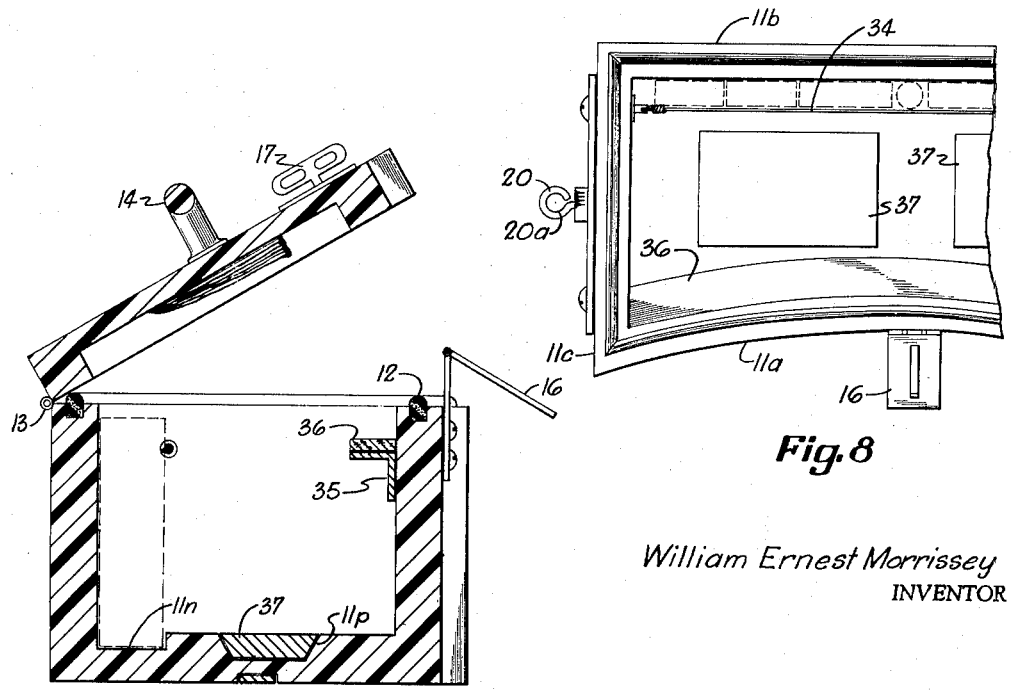
Fig. 6
Fig. 7
Fig. 8
William Ernest Morrissey
INVENTOR

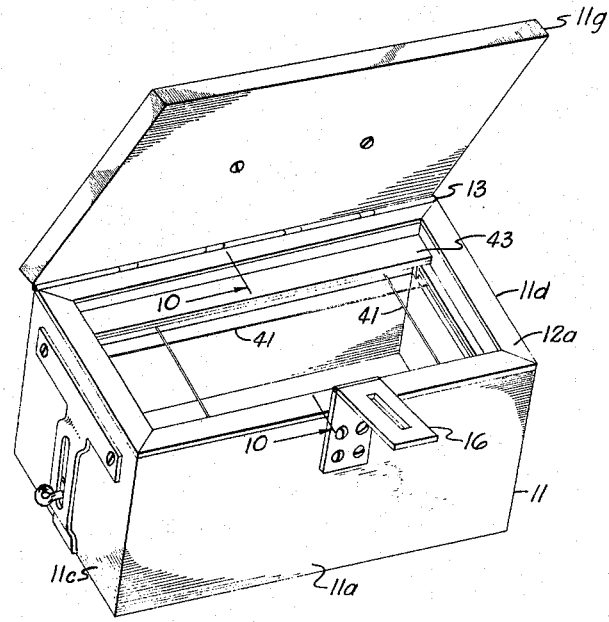
Fig. 9
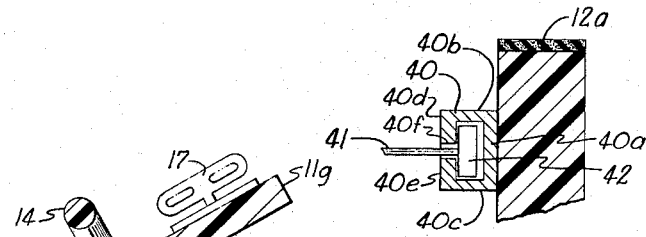
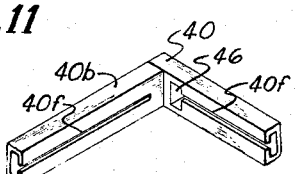
Fig. 11
Fig. 12
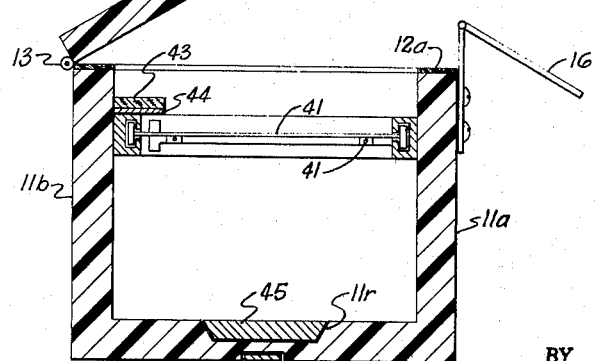
Fig. 10
William Ernest Morrissey
INVENTOR
BY John C. Stahl
ATTORNEY Aug. 17, 1965 W. E. MORRISSEY 3,201,017
FISHING TACKLE BOX
Filed Jan. 2, 1963 4 Sheets-Sheet 4

William Ernest Morrissey
INVENTOR

BY John C. Stahl
ATTORNEY

3,201,017
FISHING TACKLE BOX
William Ernest Morrissey, Rockport, Tex.
(Rte. 2, Box 125, Marion, Tex.)
Filed Jan. 2, 1963, Ser. No. 249,053
4 Claims. (Cl. 224—26)

This invention relates generally to a fishing tackle box of novel construction and more particularly to such a box used primarily by wading fishermen or fishermen in motion.

A wading fisherman, for example, often wades out quite a distance into the surf or away from the point where he has placed his tackle box on the shore or in his car. Any additional lures, baits, plugs or other fishing gear is therefore placed in his pockets or attached to his apparel. Should such a fisherman attempt to carry a conventional fishing tackle box not only is he greatly inconvenienced but also the contents of the box are often dropped into the water or, in salt water fishing, salt spray or waves may enter the tackle box, necessitating the removal, washing and drying of the contents thereof.

The fisherman walking along the bank of a stream, river, lake or ocean shore on the other hand, often finds that he has traveled several hundred feet from where he originally placed his tackle box, necessitating a return trip in the event that he wants to change his lure or requires other equipment.

The general purpose of this invention is to provide a floating fishing tackle box that is carried by a shoulder strap by either a wading fisherman or fisherman in motion whereby his equipment is conveniently available and still allows the fisherman the use of both hands while fishing. Novel partitioning means provide maximum usable space within the tackle box and permit the placement of plugs, lures or other baits without danger of entanglement or fouling; also, each individual piece of fishing gear in such box can be readily engaged or disengaged by the fisherman.

The primary object of this invention is the provision of a fishing tackle box for wading fishermen or fishermen in motion.

Another object is to provide such a box carried by a shoulder strap and which conveniently frees the hands of the fisherman.

A further object of this invention is to provide a floating, watertight fishing tackle box of novel construction allowing maximum usable space within the box.

Still another object is to provide a tackle box in which individual lures may be displayed separately and in full view with means for readily engaging and disengaging them from their carrying positions.

Another object is to provide a strong, simple, compact, durable and inexpensive box for fishing tackle and other fishing gear which allows ready access to the articles within the box.

Other objects and features of the invention will become apparent to those skilled in the art as the disclosure is made in the following detailed description of preferred embodiments of the invention as illustrated in the accompanying sheets of drawing in which:

FIG. 1 illustrates a perspective view of a preferred embodiment of the invention with the lid in open condition;

FIG. 2 shows a section of the device taken on line 3—2 of FIG. 1 looking in the direction of the arrows with the lid in almost closed condition;

FIG. 3 is a fragmentary sectional view of one end of the device;

FIG. 4 is a fragmentary sectional view of the attaching means incorporated in the upper side portions of the device;

FIG. 5 is a fragmentary sectional view of a modified attaching means placed in the upper side portions of the device;

FIG. 6 illustrates a perspective view of a modification of the invention;

FIG. 7 shows a section of the device taken on the line 7—7 of FIG. 6 looking in the direction of the arrows;

FIG. 8 is a top plan view, with the lid removed, of a portion of the device of FIG. 6;

FIG. 9 illustrates a perspective view of still another modification of the invention;

FIG. 10 shows a section of the device taken on the line 10—10 of FIG. 9 looking in the direction of the arrows;

FIG. 11 shows an enlarged sectional view of a portion of the partitioning means;

FIG. 12 is a perspective view of the partitioning means utilized in the modification of FIGS. 9 and 10;

Figure 13:
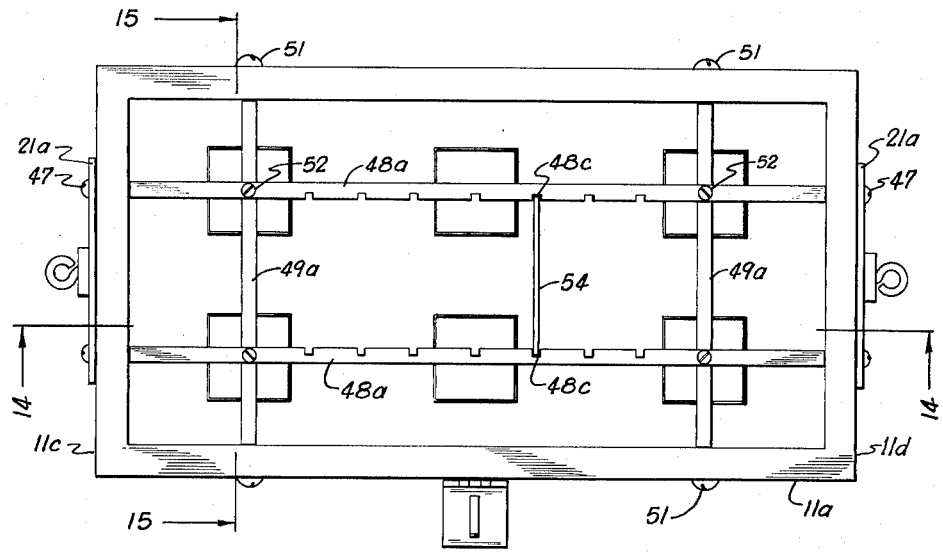
FIG. 13 is a top plan view of a further modification of the invention, with the lid removed.

Referring now to the drawings, wherein like reference characters designate like or corresponding parts throughout the several views, there is shown in FIG. 1 an essentially rectangular casing 11 consisting of sides 11a–11b, ends 11c–11d and bottom 11e. In a preferred embodiment of the invention the casing is approximately 16 inches in length, 7½ inches in width and 5 inches in height and is molded in one piece of a plastic material, light weight metal or any material which is impervious to water and not adversely affected by salt water. As best seen in FIG. 2 of the drawings the upper side and end portions contain a recess 11f into which inserts a gasket 12 or the like. Alternatively, said upper and side portions may be flat (see FIGS. 5, 11 and 14) and an essentially rectangular gasket 12a or sealing material may be secured thereto to prevent leakage into the tackle box.

A lid 11g of similar rectangular form contains a rectangularly-shaped recess portion 11h in the bottom surface thereof, said lid is attached to the upper portion of side 11b as by means of a piano-type hinge 13 or the like. Handle 14 is secured in the approximate center of the upper surface of the lid.

Lid 11g and the upper side and end portions (11a–11d) coact to form a closed hollow fishing box which, when the lid is latched or locked by means of the coacting latch parts 16 and 17, secured respectively to the side 11a and lid 11g, may be carried or transported by means of handle 14 or by an adjustable shoulder strap 18.

Referring again to FIG. 1, the shoulder strap 18 attaches as by a spring-loaded fastener 19 to member 20, said member connects to the casing by means of a T-shaped member 21, which includes horizontally and vertically-extending portions, 21a and 21b, respectively. The outermost ends of the horizontal portions are connected to the ends 11c–11d of the casing as will hereinafter be described in detail in connection with FIG. 3 of the drawings. The vertical portion 21b is slightly offset and extends outwardly with respect to portion 21a, said portion 21b contains a longitudinal slot 21c in which member 20 slidably rides. As best seen in FIG. 3, member 20 terminates at one end in a ring 20a into which inserts fastener 19; said member 20 further includes a shank portion extending horizontally through slot 21c and terminating in a flattened or expanded portion 20b. In this manner the tackle box of the subject invention rides at water level when the box is slung over the shoulder and used by a wading fisherman. The vertically-extending portion 21b of member 21 is bent inwardly in proximity to the lower portion of the casing (see FIGS. 1 and 3) and inserts into a recessed portion 11j in the lower surface of bottom 11e and extends beneath and joins the corresponding vertical portion 21b of member 21 attached to the opposite end of the casing.

The outermost ends of horizontal portion 21a contain bores 22 which align with corresponding bores 23 in the ends 11c–11d of the casing. In the embodiment of FIG. 3 a bolt 24 containing a bore 24a in the end thereof inserts through bores 22 and 23, a washer 25 and corresponding nut 26 is threaded thereon. The dividers or partitioning means in this embodiment of the invention are in the form of wires 27 which extend parallel to and are spaced with respect to the sides and ends of the casing as shown in FIG. 1. One end of wire 27 is threaded through bore 24a and wrapped back upon itself to form a smooth and secure connection. The free end of said wire is tensioned and drawn through the bore 24a in the corresponding bolt positioned in the opposite end of the casing and the free end of said wire is wrapped back upon itself to form a secure connection.

There is illustrated in FIGS. 4 and 5 alternative means whereby the dividers may be attached to the corresponding elements positioned in the opposite sides of the casing. In FIG. 4 an insert 28 containing a head 28a and a longitudinally-extending female threaded portion 28b inserts into a bore in opposite sides of the casing. Screw 29, containing a bore 29a in the end portion of the shank, inserts into the female threaded portion of the insert 28 to form a water-tight fit. The wire passes through the bore 29a and the corresponding bore of the bolt positioned in the opposite side wall and is secured thereto in the manner heretofore described in detail. Alternatively, as illustrated in FIG. 5, a wide-headed bolt 30 including a bore 30a in the end of the shank inserts through the casing. A washer 31 is placed on said bolt adjacent the inner surface of the side walls and is held in position by a cotter pin 32 or the like passing through a bore 30b thereby anchoring the bolt in position and preventing the same from being dislodged in the event the wire breaks or expands to any extent. A cylindrical sleeve 39 of rubber, plastic or the like (see FIG. 4) may fit over any of the connections heretofore described to prevent injury to the person or damage to articles within the box. It is to be understood, of course, that a water-proofing material may be placed in the bores or beneath the head portion of the bolts or screws to prevent water leakage into the casing.

Referring now to FIG. 2 of the drawings, the interior surface of the bottom 11e contains a recessed portion 11k parallel to and aligned with respect to the wires or dividers 27 into which recess the base or lower portion of any container or article placed in the tackle box is additionally secured. The central raised portion of the bottom includes a recess 11m which accommodates a weight 33. The weight preferably is secured in position in said recess with an adhesive or glue compatible with the materials of which the casing and weight, respectively, are composed. A single or a plurality of weights positioned in such manner in the bottom of the casing causes the tackle box to be self-righting in the event the box inadvertently falls into the water and also causes the box to float evenly when used by a wading fisherman.

In FIG. 6 there is illustrated a modification of the invention wherein one side of the tackle box is concave so as to more or less conform to the curve of the side of the body of the fisherman when the tackle box is slung from the shoulder by the strap 18 (used but for purposes of convenience only not illustrated in connection with this embodiment). A wire divider 34 and corresponding recessed portion 11n (see FIG. 7) in the bottom surface aligned with respect to said wire secures the containers illustrated in dotted-line portions in the manner heretofore described. An angled brace 35, curved to conform with the interior curved surface of the casing (also see FIG. 8) supports a cork bar 36. Hooks, lures and plugs conveniently may be inserted into said cork bar. As best seen in FIG. 7 recessed portions 11p in the lower surface of the casing accommodate weights 37, said weights being positioned slightly off-center whereby the moments about the longitudinal axis of the tackle box are minimized and the box floats evenly when placed in the water. In FIG. 6 a bag 38 including a backing material 38a and an elastic band or drawstring 38b in the opening thereof is secured in recessed portion 11h of the lid by gluing said backing material 38a onto the inner surface of said recess with a conventional adhesive.

Another modification of the tackle box of the subject invention is illustrated in FIGS. 9–12 of the drawings. More specifically, a rectangularly-shaped channel member 40, positioned in the upper portion of the casing, allows the dividers 41 to be slidably positioned at any desired location within the box to accommodate articles or containers of any shape or configuration. The casing of this embodiment is constructed in accordance with the principles heretofore described in conection with FIGS. 1–5 of the drawings. As best seen in FIG. 11 the member 40 includes a back 40a, top and bottom (40b, 40c) and upper and lower front portions (40d, 40e) separated by a longitudinally-extending groove 40f through which passes the divider 41. The divider 41 is terminated at both ends with an element 42 connected thereto and which element bears against the inner surfaces of portions 40d–40e. Member 40 preferably is constructed of aluminum or the like and may be frictionally attached to the upper inner surfaces of the tackle box or alternatively may be affixed thereto utilizing a conventional adhesive, rivets or the like. It is to be understood that said member 40 may also be inserted in a recess in the upper interior side and end walls of the tackle box in such a manner that the upper and lower front portions 40d–40e are flush with the inner surface of the casing.

As illustrated in FIG. 10 of the drawings, one side of the casing includes cork bar 43, heretofore described, which is supported by a rectangular bar 44 attached to the top 40b of member 40. In said embodiment the interior bottom surface of the casing is flat except for a recess 11r which accommodates a weight 45 fixedly positioned therein. There is shown in FIG. 12 an expanded portion 46 at either one or both ends of groove 40f to allow replacement of the dividers in the event of breakage or when additional dividers are required. It is to be further understood that the dividers utilized in this embodiment may be constructed of heavy gauge wire with twisted end portions perpendicular to the length thereof or may be constructed of any material with integrally-formed elements insertable into and slidable along the groove 40f of the member 40.

Figure 14:
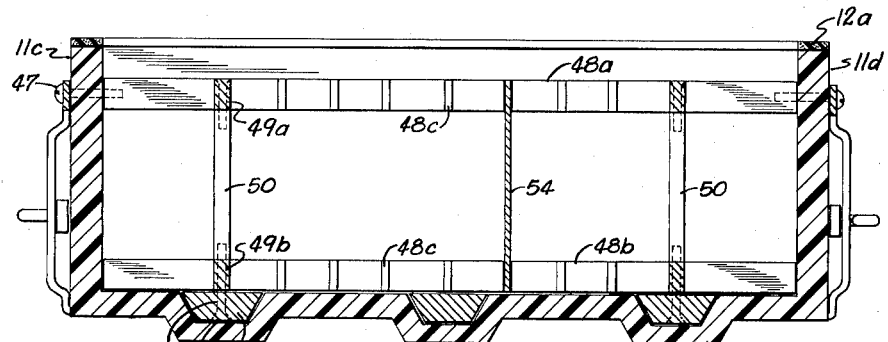
FIG. 14 shows a section of the device taken on the line 14—14 of FIG. 13 looking in the direction of the arrows.
Figure 15:
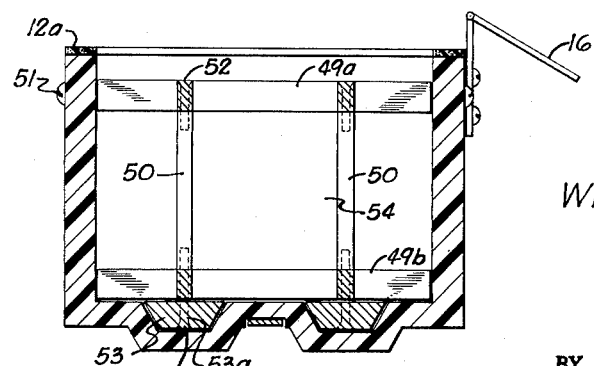
FIG. 15 is a section of the device taken on the line 15—15 of FIG. 13 looking in the direction of the arrows.

Referring now to FIGS. 13–15 of the drawings, there is shown a still further modification of the invention. In this embodiment the interior of the casing includes a framework consisting of upper and lower longitudinally-extending dividers (48a, 48b), upper and lower laterally-extending dividers (49a, 49b) and vertical supports 50. The framework is preferably constructed of aluminum or other lightweight metal. Screws 47 extend through corresponding bores in portions 21a and the ends 11c–11d of the casing and threadedly insert into the ends of dividers 48a. Screws 51 extend through bores in the upper side portions 11a–11b of the casing into the ends of laterally-extending dividers 49a. Dividers 48a, 49a are notched to receive lateral dividers 49a, 49b; screws 52 or other attaching means pass through dividers 48a, 49a into the upper portion of vertical supports 50.

As best seen in FIG. 14 the lower surface of the casing contains a plurality of protruding portions which contain weights 53 fixedly secured therein by gluing or the like. Screws 54 pass through bores 53a in weights 53, through dividers 48b and 49b, respectively, into the lower portion of supports 50 for additional strength.

Longitudinal dividers 48a, 48b include oppositely-positioned indented portions 48c into which a sub-divider 54 may be inserted. The dividers 48b, 49b hold the lower portion of any container or the like placed in the tackle box securely in position.

All materials exposed to the water and especially those of metal preferably consist of stainless steel, aluminum or other materials not affected to any great extent by salt water.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A floatable fishing tackle box comprising an essentially rectangular casing consisting of sides, ends and bottom, a closure member hingedly secured to one of the sides, at least one weight fixedly positioned in the bottom of said casing, a T-shaped member on each end of the casing, attaching means passing through the ends of the casing and securing said member to the casing, longitudinal partitioning means within the casing connected to said attaching means, lateral partitioning means within the casing connected to the sides, said longitudinal and lateral partitioning means consisting of wire, a shoulder strap attached to said member whereby the tackle box floats at water level when said strap is slung over the shoulder of a wading fisherman.

2. A floatable fishing tackle box comprising a casing consisting of sides, ends and bottom, a lid hingedly secured to one of the sides, the opposite side being concave to at least partially conform to the curvature of the body of the user, wire partitioning means within the casing and secured to the ends of said casing, a brace conforming to the curvature of said concave side and connected to the inner side of the casing, a porous material conforming to the configuration of and attached to said brace, a recessed portion in the bottom surface of the casing aligned with respect to said partitioning means and at least one weight fixedly positioned in the bottom of the casing.

3. A floatable fishing tackle box comprising an essentially rectangular casing consisting of ends, sides and bottom, a lid hingedly secured to one of the sides, at least one weight fixedly mounted in the bottom of the casing, a member on each end of the casing, attaching means passing through the ends of the casing and securing said member to the casing, channel means secured in the uppermost inner side and end portions of said casing, longitudinally and laterally adjustable wire partitioning means secured in said channel whereby the said partitioning means may be positioned at any desired location within the casing.

4. A floatable fishing tackle box comprising an essentially rectangular casing consisting of ends, sides and bottom, a lid hingedly secured to one of the sides, a framework within said casing consisting of upper and lower longitudinally-extending partitions, upper and lower laterally-extending partitions, vertical supports, means passing through the ends of said casing into said upper longitudinally-extending partitions, additional means passing through the sides of said casing into the upper laterally-extending partitions, securing means passing through the upper longitudinally and laterally-extending partitions into the upper end of said vertical supports, a plurality of weights fixedly mounted in the bottom of the casing and additional securing means passing through said weights and the lower longitudinally and laterally-extending partitions into the lower portion of the vertical supports.

References Cited by the Examiner

UNITED STATES PATENTS

| 89,173 | 4/69 | Sander | 206—12 |
|---|---|---|---|
| 941,608 | 11/09 | Benson | 206—12 |
| 2,013,281 | 9/35 | McCalla | 206—12 |
| 2,065,234 | 12/36 | Martinez | 206—16 |
| 2,767,508 | 10/56 | Kiember | 43—56 |
| 2,811,276 | 10/57 | Ray | 220—16 X |
| 2,968,887 | 1/61 | Woolworth | 43—56 |
| 3,009,281 | 11/61 | Unger | 43—56 |

FOREIGN PATENTS

| 1,166,967 | 11/60 | France. |
|---|---|---|
| 858,948 | 12/52 | Germany. |
| 676,229 | 7/52 | Great Britain. |
| 778,697 | 7/57 | Great Britain. |
| 873,693 | 7/61 | Great Britain. |

LOUIS G. MANCENE, *Primary Examiner.*

THERON E. CONDON, *Examiner.*